(12) United States Patent
Abron

(10) Patent No.: US 12,730,607 B1
(45) Date of Patent: Sep. 8, 2026

(54) SMART AUDIO SPEAKER CONTROL

(71) Applicant: Elijah Abron, Silver Spring, MD (US)

(72) Inventor: Elijah Abron, Silver Spring, MD (US)

( * ) Notice: Subject to any disclaimer, the term of this patent is extended or adjusted under 35 U.S.C. 154(b) by 0 days.

(21) Appl. No.: 19/097,583

(22) Filed: Apr. 1, 2025

(51) Int. Cl.
*G06F 3/16* (2006.01)
*H04R 1/02* (2006.01)

(52) U.S. Cl.
CPC .............. *G06F 3/167* (2013.01); *G06F 3/162* (2013.01); *G06F 3/165* (2013.01); *H04R 1/028* (2013.01)

(58) Field of Classification Search
CPC .......... G06F 3/167; G06F 3/162; G06F 3/165; H04R 1/028
See application file for complete search history.

(56) References Cited

U.S. PATENT DOCUMENTS 11,037,572 B1 * 6/2021 Beal ........................ G10L 17/00
11,468,275 B1 * 10/2022 Blechschmidt ........ G06N 20/00
2007/0188427 A1 * 8/2007 Lys ........................ H05B 45/46 345/82
2015/0035680 A1 * 2/2015 Li ........................... G01K 1/14 340/584
2019/0362319 A1 * 11/2019 Yen .................... G06Q 10/1097
2024/0265204 A1 * 8/2024 Meeks .................. G06F 40/279
2024/0274140 A1 * 8/2024 Woodruff ................ G10L 15/22
2024/0385744 A1 * 11/2024 White ................ G06F 3/04883

* cited by examiner

*Primary Examiner* — Michael Colucci

(57) ABSTRACT

The present disclosure includes a system with a first device, a speaker vibrating diaphragm canvas artwork, and a second device featuring a first module and music content. It may also involve a second module, an amplifier, and a smoke detector, the method consists of receiving speech input from an input device in first mode, connected to the output device's first port, requesting artwork content, the input device determines that an artwork response should be displayed on a output device, it then plays an audio message through the diaphragm canvas speaker, indicating that the artwork response will be presented, subsequently, the input device switches to a second mode by sending a control signal to change the active input port to the first port and then sends the artwork response to the output device.

20 Claims, 7 Drawing Sheets

SMART AUDIO SPEAKER CONTROL

BRIEF SUMMARY

Embodiments of the present disclosure may include a system, a first device, and an artwork. Embodiments may also include a second device, including a first module. Embodiments may also include music. Embodiments may also include a second module. Embodiments may also include an amplifier. Embodiments may also include a third device, a smoke detector.

In some embodiments, the first device may be a Bluetooth processor. In some embodiments, the second device may include a third module, the Alexa device. Embodiments may also include a fourth module power transformer. In some embodiments, the system may include a fourth device, an intercom system through the artwork.

In some embodiments, the first device may be a Bluetooth processor. In some embodiments, the second device may include a third module, the Alexa device. Embodiments may also include a fourth module power transformer. In some embodiments, the system may include a fourth device, a smoke detector.

In some embodiments, the first device may be a Bluetooth processor. In some embodiments, the second device may include a third module, the Alexa device. Embodiments may also include a fourth module power transformer. In some embodiments, the system may include a fourth device, a Ring camera Unit.

In some embodiments, the first device may be a Bluetooth processor. In some embodiments, the second device may include a third module, the Alexa device. Embodiments may also include a fourth module power transformer. In some embodiments, the system may include a fourth device, a vibrating diaphragm canvas.

In some embodiments, the first device may be a Bluetooth processor. In some embodiments, the second device may include a third module, the Alexa device. Embodiments may also include a fourth module power transformer. In some embodiments, the system may include a fourth device, an artist canvas frame.

In some embodiments, the first device may be a Bluetooth processor. In some embodiments, the second device may include a third module, the Alexa device. Embodiments may also include a fourth module power transformer. In some embodiments, the system includes a fourth device, a Power Supply.

In some embodiments, the first device may be a Bluetooth processor. In some embodiments, the second device may include a third module, the Alexa device. Embodiments may also include a fourth module power transformer. In some embodiments, the system may include a fourth device, LED lights.

In some embodiments, the second device may include a third module, the Alexa device. Embodiments may also include a fourth module, a camera device. In some embodiments, the system may include a fourth device, a WiFi. In some embodiments, the second device may include a fifth module, an Alexa device. Embodiments may also include a fifth exciter speaker module. In some embodiments, the system may include a fourth device, the remote-control module.

DETAILED DESCRIPTION

Figure 1:
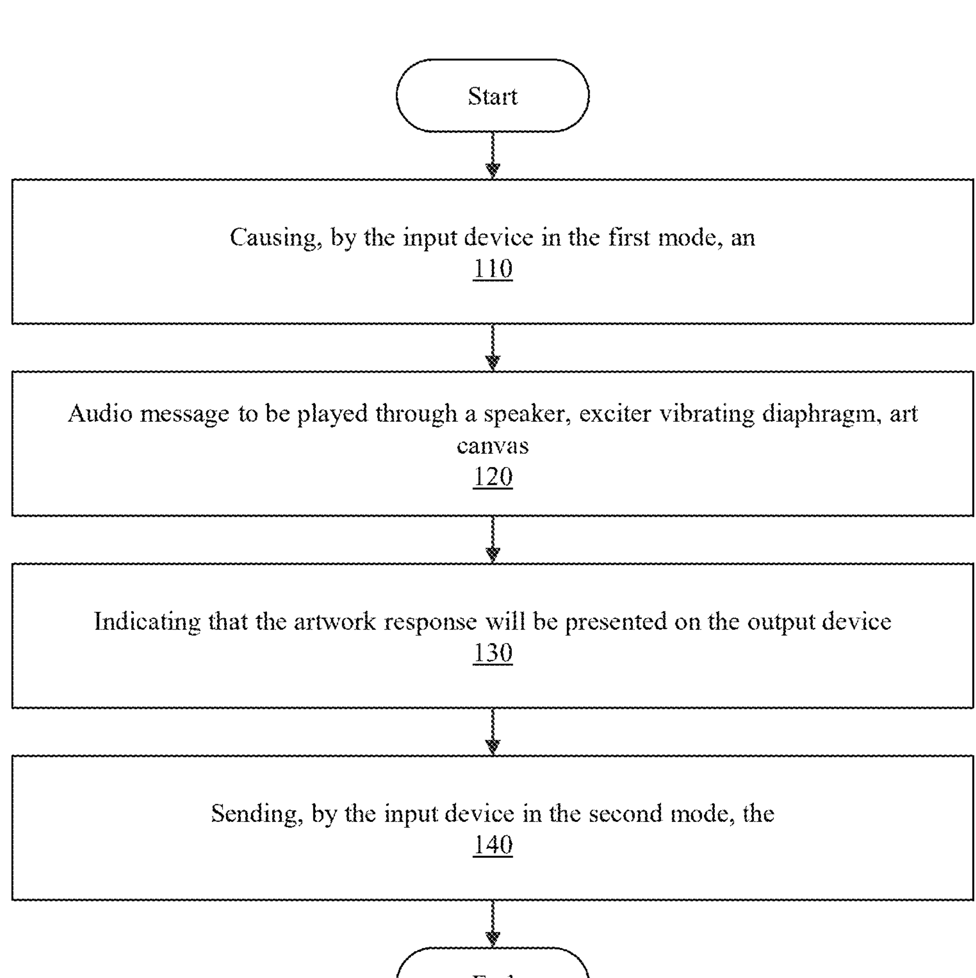
FIG. 1 is a block diagram illustrating a system, a picture frame body, according to some embodiments of the present disclosure.

FIG. 1 is a block diagram that describes system 100, according to some embodiments of the present disclosure. In some embodiments, system 100 may include the first device 110, a piece of artwork 120, a second device 140, and a third device 130-*a* smoke detector. The second device 140 may include the first module 142, music 144, a second module 146, and an amplifier 148. In some embodiments, the first device, 110, may be a Bluetooth processor. In some embodiments, the System 100 may include a fourth device, LED lights. In some embodiments, the System 100 may include a fourth device, Wi-Fi. System 100 may include a fourth device, the remote-control module, in some embodiments.

Figure 2:
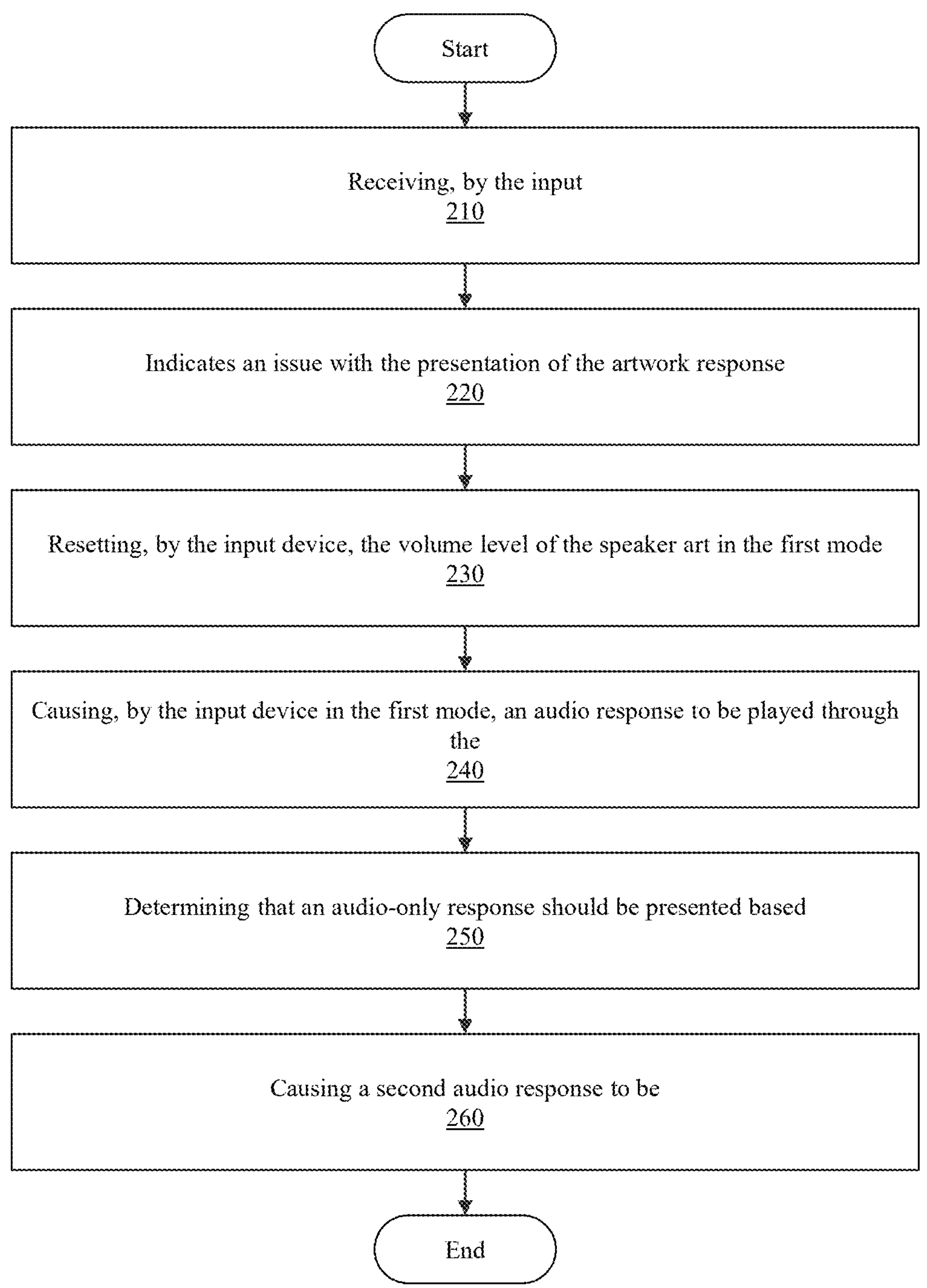
FIG. 2 is a block diagram further illustrating the system from FIG. 1, which, according to some embodiments of the present disclosure, is a picture diaphragm canvas.

FIG. 2 is a block diagram that further describes the system 100 from FIG. 1, according to some embodiments of the present disclosure. In some embodiments, the second device 140 may include a third module, an Alexa device 245, and a fourth power transformer 246.

Figure 3:
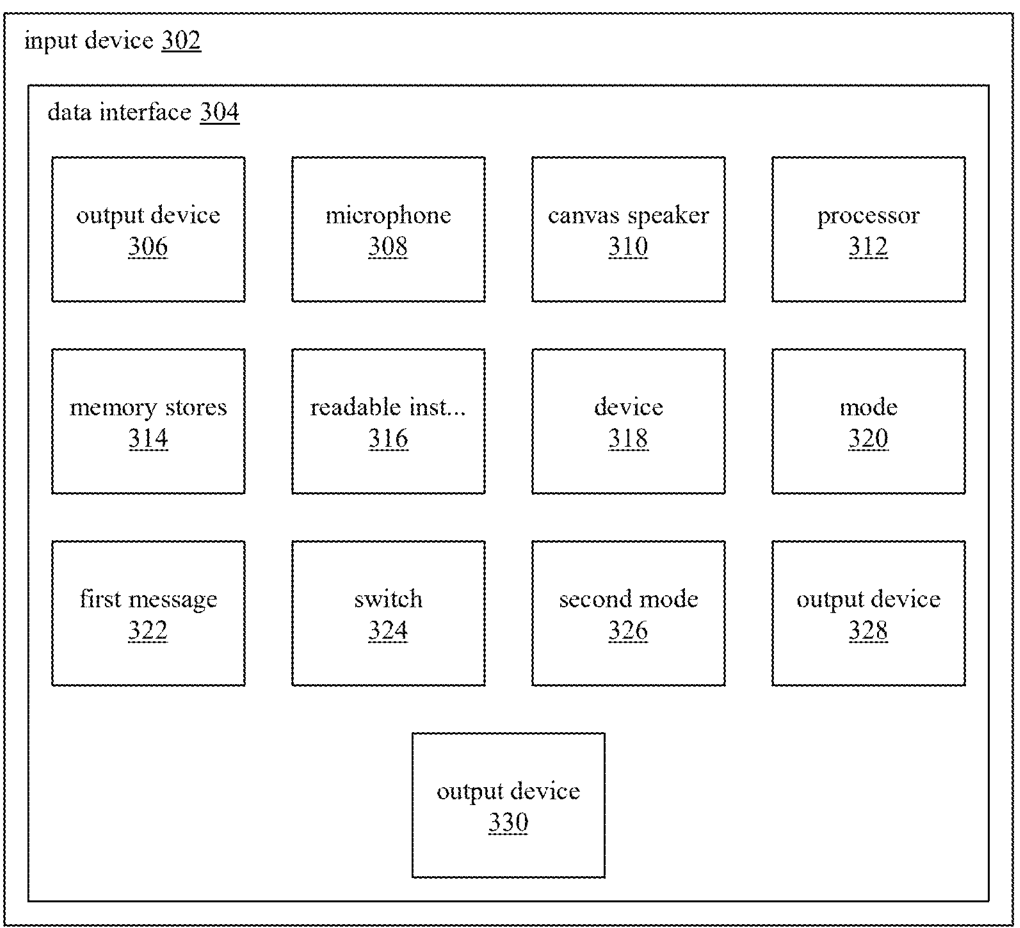
FIG. 3 is a block diagram further illustrating the system from FIG. 1, which includes a built-in camera according to some embodiments of the present disclosure.

FIG. 3 is a block diagram that further describes the system 100 from FIG. 1, according to some embodiments of the present disclosure. In some embodiments, the second device 140 may include a third module, an Alexa device 345, and a fourth module, 346, a camera device.

Figure 4:
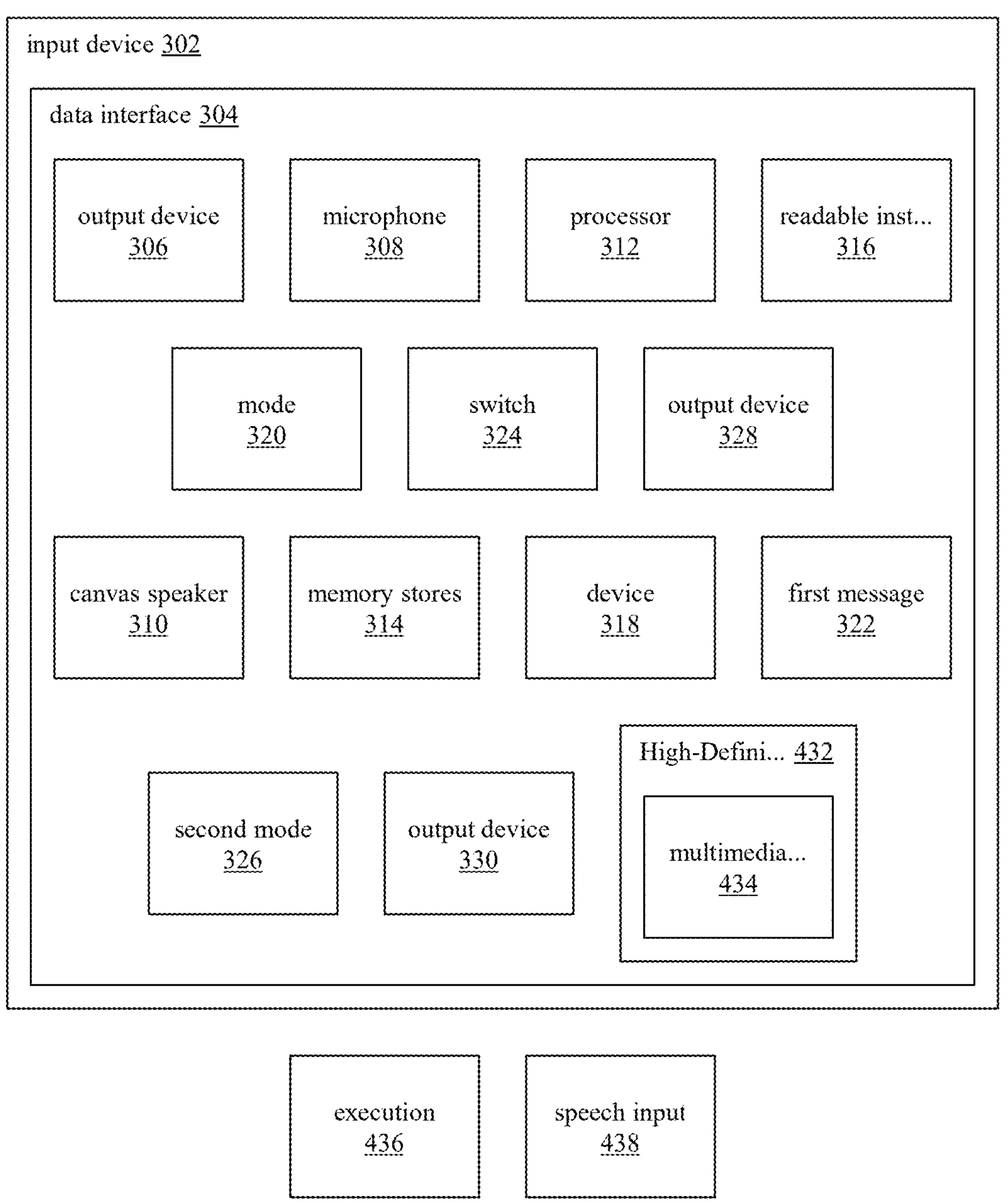
FIG. 4 is a block diagram further illustrating the system from FIG. 1, which includes a building smoke detector according to some embodiments of the present disclosure.
Figure 5:
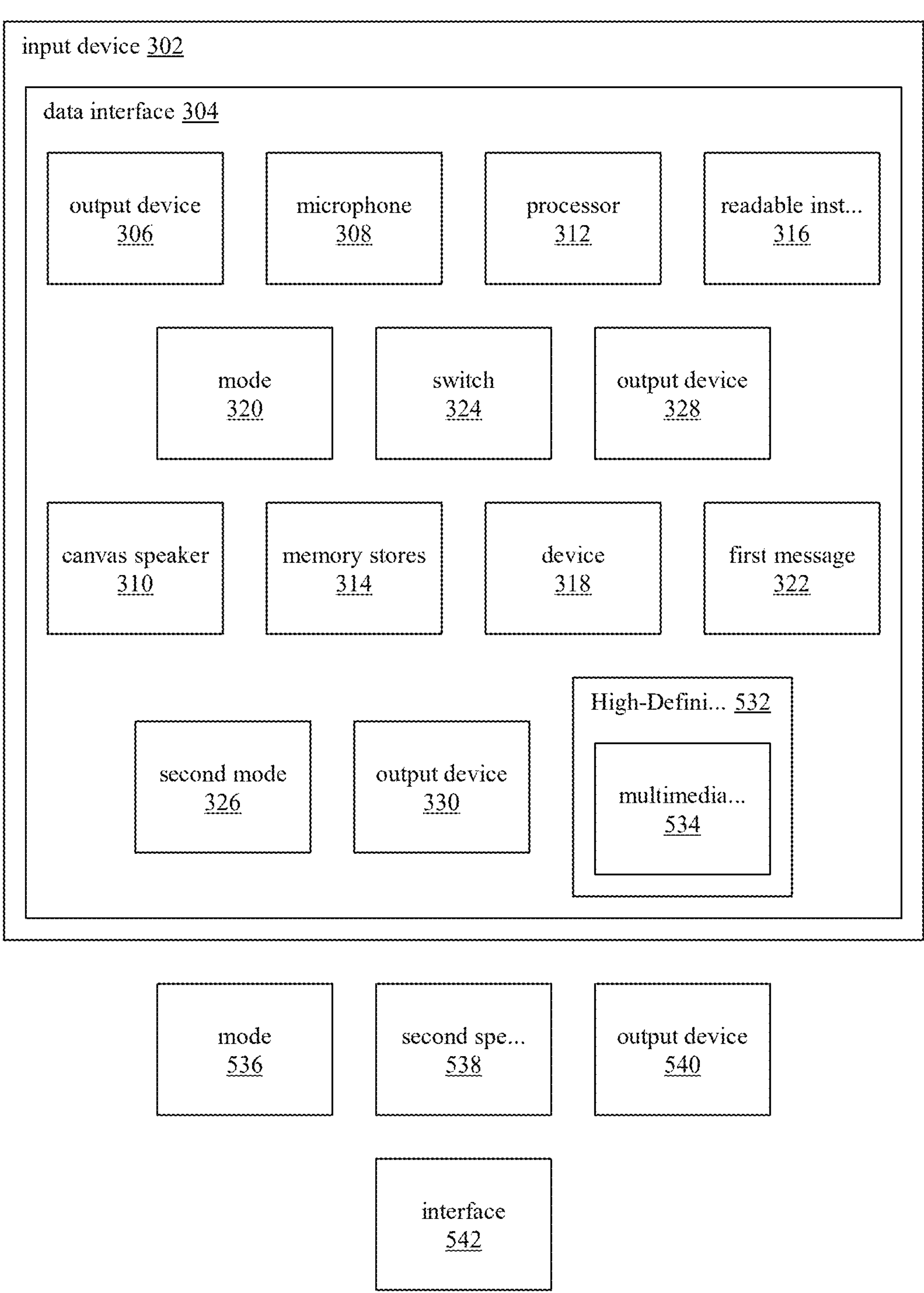
FIG. 5 is a block diagram further illustrating the system from FIG. 1, which includes an amplifier according to some embodiments of the present disclosure.
Figure 6:
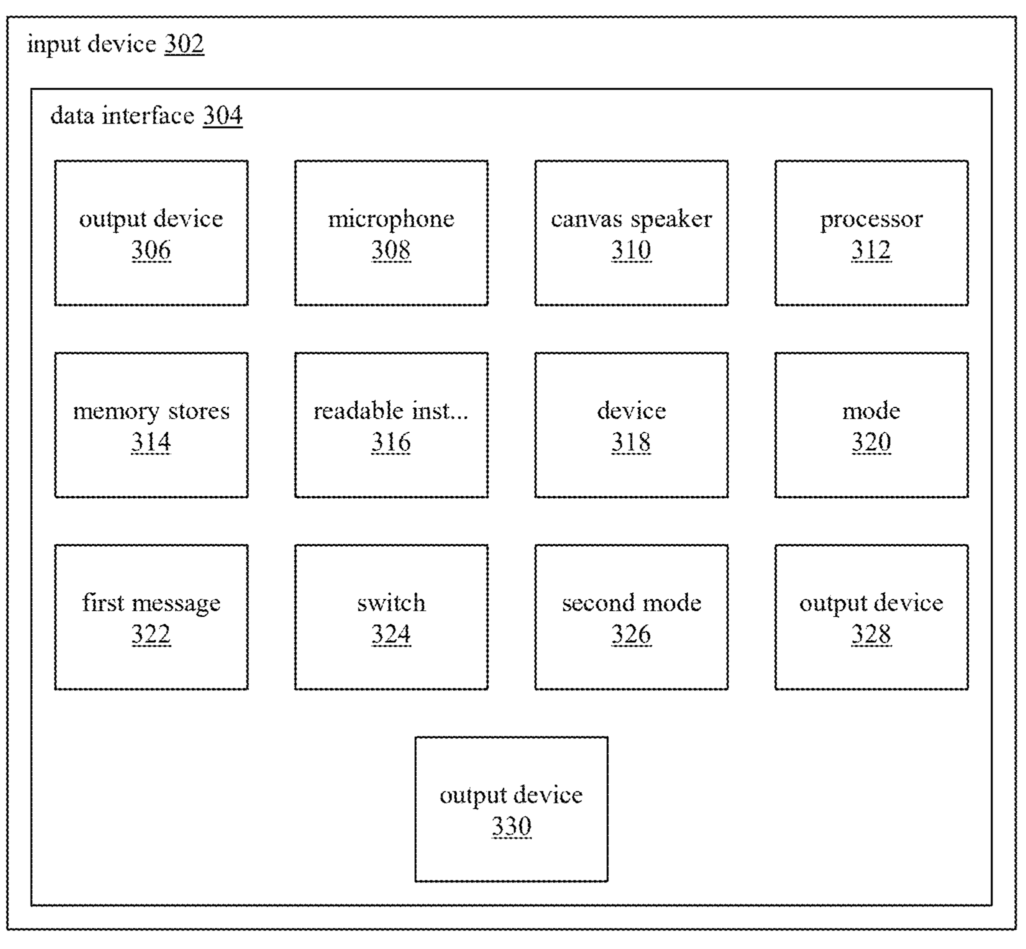
FIG. 6 is a block diagram further illustrating the system from FIG. 1, which includes a remote control according to some embodiments of the present disclosure.
Figure 7:
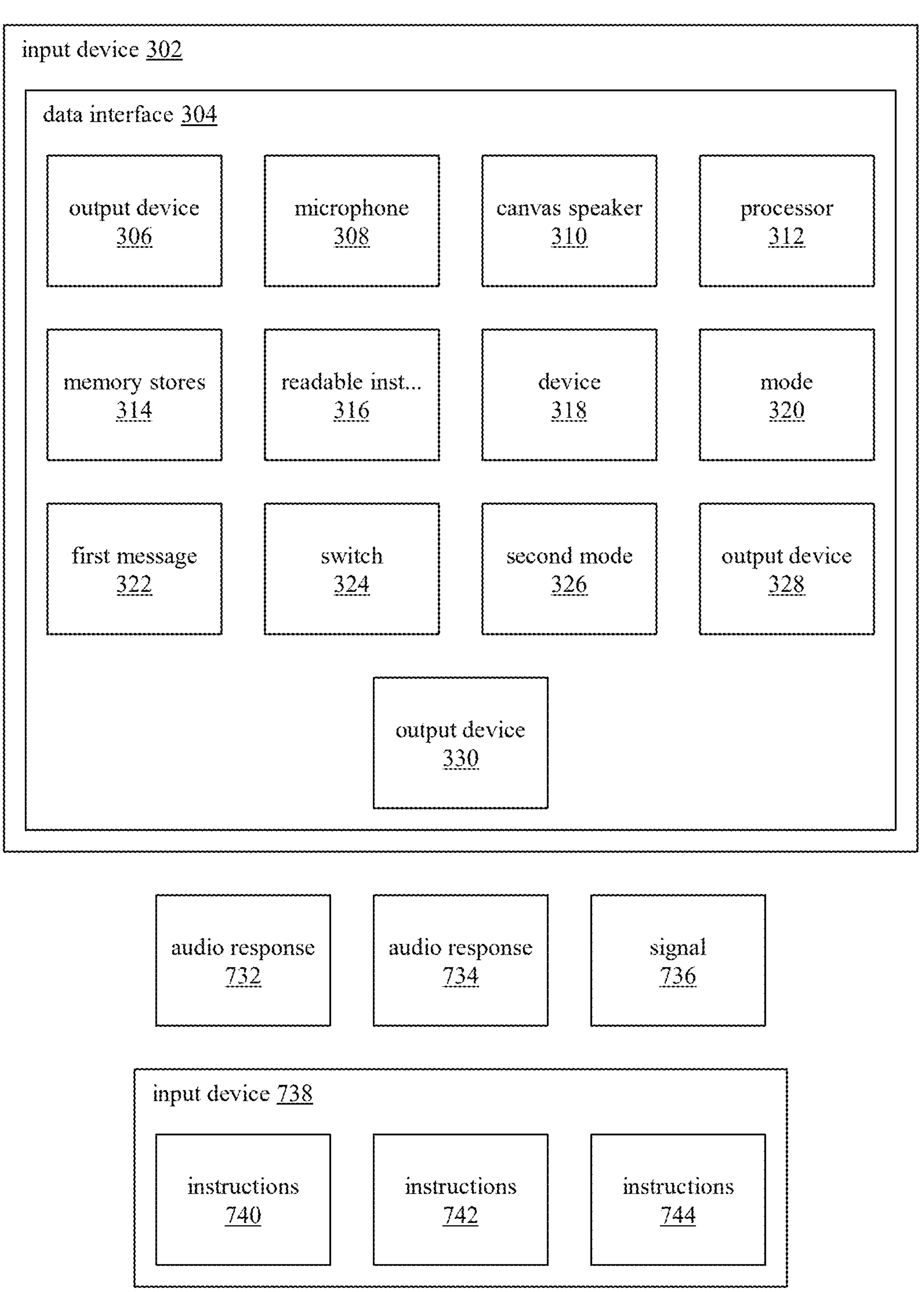
FIG. 7 is a block diagram further illustrating the system from FIG. 1, which includes exciter speakers according to some embodiments of the present disclosure.

FIG. 4 is a block diagram that further describes the system 100 from FIG. 1, according to some embodiments of the present disclosure. In some embodiments, the second device 140 may include a fifth module, an Alexa device 445, and a fifth module 446, an exciter speaker module.

BACKGROUND

As voice recognition technology advances, various systems that utilize this technology are becoming increasingly common. Some systems employ near-field voice recognition, where Users speak indirectly through a vibrating diaphragm canvas as a microphone within the artwork device, a remote control, or a mobile phone. Other systems use far-field voice recognition, allowing users to speak from a distance within the same room without needing to be directly in front of the diaphragm canvas speaker art. Both far-field and near-field devices can be used to request content for playback on audio systems. However, due to the growing complexity of many home audio setups, there is still a need for reliable voice-controlled devices that can effectively manage content playback across multiple systems using voice commands.

DESCRIPTION

The following description outlines various embodiments. Specific configurations and details are provided to ensure a thorough understanding; however, it is apparent to those skilled in The art can be implemented without these details. Additionally, well-known features may be omitted or simplified in nonvisual media to obscure the embodiment described.

This disclosure discusses systems, methods, computer-readable media, techniques, and methodologies for devices that can be voice-controlled and respond to audible instructions. For example, voice-controlled multimedia devices (SASC) can connect to an external presentation device and operate in multiple modes. The presentation device may include a speaker and an artwork display, an audio amplifier with a speaker, or any other user interface capable of displaying data to a user.

In the first mode, the SASC sends data to the presentation device for display to the user. SASC does not send data to the presentation device in the second mode. Instead, the data is presented on its internal presentation interface. For instance, the SASC may play audio through its internal speaker exciter.

When the SASC receives speech input from the user indicating that a response should be shown on the presentation device, it sends the response to the device in the first mode. If the SASC then receives speech input from the user indicating an issue with how the response was presented (for example, if an audio response was not heard), it switches to the second mode. In this mode, the SASC presents a message on its internal presentation interface stating that subsequent responses will be displayed. It remains in the second mode for subsequent responses until the user provides a speech input requesting a return to the external device. At that point, the SASC displays a message on its internal presentation interface indicating the shift back to the presentation device, reverts from the second mode to the first mode, and sends the relevant response to the presentation device for display.

For illustration, consider a Smart Audio and Speaker Control (SASC) connected to a speaker exciter. Via a High-Definition Multimedia Interface (HDMI) port. This device responds to a specific wake word, such as "HELLO." When a user says, "HELLO, play the movie music," The SASC enters the first mode, "Audio Mode." This mode flashes LED lights and sends audio data to the external speaker over the HDMI port. However, there may be situations where the HDMI port is not the active input on the speaker exciter. As a result, the audio and artwork data may cause the stream to pass through the speaker exciter, leaving the user unaware that the SASC is attempting to transmit this data.

If the user says, "A KEY WORD, I can't hear you," the SASC recognizes this as an indication of an issue with the nonvisual data stream. In response, it switches to the second mode, "Audio Mode." The SASC resets its volume to a default level, flashes its LED lights, and plays music and an audio message through its internal exciter vibrating diaphragm speaker. "Okay, I'll talk to you here now." From then on, SASC handled speech requests for audio responses using its internal exciter speaker while remaining in audio mode. If an audio media response is requested, the SASC will announce through its internal speaker exciter that the non-visual response will be played on the connected exciter vibrating diaphragm speaker (e.g., "Okay, your movie is about to start on the speaker art"). It then sends a nonvisual control signal to the exciter speaker to set its active input to the HDMI port and transmit the nonvisual response to the exciter speaker.

The embodiments described in this disclosure offer several technical advantages over existing art Entertainment with Speaker control systems. For example, these embodiments allow the SASC to reliably play audio content through its internal speaker art in one mode and through an external presentation device in another, all in response to user voice commands. Even if the external presentation device fails to signal the SASC that a data path is sending visually available information, the SASC can still switch to the appropriate mode to respond to the user's commands.

To clarify the explanation, the embodiments are described as audio requests (for example, requests for both audio and artwork content) and non-visual requests (such as requests for audio-only content) directed at a Speech and Audio Signal Controller (SASC) that is connected to a speaker exciter within the artwork. The diaphragm canvas speaker, an art canvas, an amplifier, and a camera system. This setup may include a vibrating diaphragm canvas acting as the speaker, a camera, a smoke detector, and can be an external wire or Bluetooth connection. However, these embodiments are not limited to this context and apply to other types of requests and presentation systems. For instance, a SASC might include an internal presentation interface, such as an internal speaker exciter and smoke detector sensor: Displays, light-emitting diodes (LEDs) arrays, and various external devices.

Generally, a SASC is connected to a presentation device. In response to a user's speech input, the SASC can either play a response through its internal presentation interface or send it to the external presentation device. This decision depends on factors such as the speech input's content, the SASC's mode, and the presentation device's state. If a specific speech input indicates that the user did not understand the response, the SASC can use its internal presentation interface to respond again.

The invention claimed is:

1. A computer-implemented method comprising receiving, by an input device, first speech input while the input device is operated in a first mode and connected to a first port of an output device, wherein the first speech input requests at least artwork content, determining, by the input device, that an artwork response is to be presented on the output device based on the least Artwork arts on the first speech input; causing, by the input device in the first mode, an audio message, a camera, and a smoke detector to be played through the diaphragm canvas speaker, within the artwork's diaphragm canvas, indicating that the artwork's response will be presented on the output device, switching, by the input device, from the first mode to a second mode by sending a control signal to the output device, with the control signal being associated with changing the active port of the output device to the first port, and sending and monitoring video to the input device; In the second, the artwork responds to the output device via the first port.

2. The computer-implemented method of claim 1 further comprising: receiving, by the input device, second speech input while in the second mode, where the second speech input indicates an issue with the presentation of the artwork response, switching, by the input device, back to the first mode based at least on the Artwork arts on the second speech input resetting, by the input device, the volume level of the diaphragm canvas speaker art in the first mode, causing, by the input device in the first mode, an audio response to be played The amplifier is connected to the diaphragm canvas speaker exciter within the art frame according to the volume level.

3. The computer-implemented method of claim 2 further comprises receiving a third speech input by the input device, a camera, determining that an audio-only response should be presented based on at least pictorially on the third speech input, and causing a second audio response to be played through the diaphragm canvas speaker art by the input device in the first mode in response to the third speech input.

4. An input device comprising a data interface configured to connect the input device to an output device, a microphone, a diaphragm canvas speaker, a processor, and memory stores computer-readable instructions; Upon execution by the processor, these instructions configure the input device to receive, via the microphone, the first speech input while in association with presenting speech input responses through the diaphragm canvas speaker art, it was determined that the first response to the first speech input will be presented on the device; play a first message through the vibrating diaphragm speaker art, indicating the first a response will be presented on the output device; switch, by the input device, from the first mode to the second mode, where the second mode is associated with presenting the response on the output devices, such as a smoke detector alarm, flashing lights, and sending, by the In the second mode, the first response to the device is via the data interface.

5. The input device of claim 4, wherein the data interface comprises a High-Definition Multimedia Interface (HDMI); The memory stores additional computer-readable instructions that, upon execution by the processor, configures the input device to send a control signal to The output device, with the control signal associated with changing the active input connect the output device to the first port connected to the HDMI interface.

6. The input device of claim 5, wherein the memory stores further instructions that, upon execution by the processor, configure the input device to receive, via the microphone, the second speech input while in the second mode, with the second speech input indicating issue with the presentation of the first response; switch back to the first mode based on at least on the Artwork arts on the second speech input, and play a second response to the second Speech input through the diaphragm canvas speaker artwork.

7. The input device of claim 5, wherein the memory also stores additional instructions that, execution by the processor, configure the input device to receive, while in the second mode, second speech input, determine that a second response to the second speech input will be presented on the output device; identify the activity state associated with the data. interface as inactive; send a control signal to the output device, with the control signal being associated with changing the activity state to active, and sending the second response to the output device.

8. The input device of claim 4, described as designed to receive speech input in a second Mode: It processes this input to determine an appropriate response for the output device, and It checks whether the data interface is active; If the data interface is active, the device will Pause the data stream and present the response while the stream is paused.

9. The input device of claim 4 stores instructions that, when executed, enable the device to receive a second speech input, determine a response, check if the data interface is active, Verify whether the output device's power state is unknown and send the response.

10. The input device of claim 4 can also receive a second speech input, determine a response, Check if the data interface is inactive, verify whether the output device's power state is unknown, send control signals to activate the data interface, and the power state, and present The response to the output device.

11. The input device of claim 10, allows for receiving second speech input, determining an audio response, checking if the data interface is inactive, and presenting the audio response through the diaphragm speaker art while in the second mode.

12. The input device of claim 11, configures itself to handle the second speech input, determine an audio response, check if the data interface is active, and send the audio response to the output device.

13. The input device of claim 12, allows for receiving a second speech input, determining an audio response, ensuring that the activity state is active, pausing the data stream, and sending the audio response during the pause.

14. The input device of claim 13, One or more non-transitory computer-readable storage media storing instructions that, when executed on an input device, perform operations including receiving first speech input in a first mode associated with presenting responses at a speaker art; determining that the first response will be presented at an output device, which is communicatively coupled to the input device; notifying that the response will be presented at the output device; switching to a second mode for presenting the response at the output device; and sending the response to the output device.

15. The input device of claim 14, includes instructions to receive the second speech input in the first mode, determine that the second response will be presented at the diaphragm speaker art, and present the second response while in the first mode.

16. The input device of claim 15, also includes instructions to receive a second speech input, determine the output device's power or activity state, and present an audio or video response or both to the speaker art while remaining in the first mode.

17. The input device of claim 16, includes instructions to determine the output device's power or activity state and send control signals based on these states to present the first response.

18. In the input device of claim 17, the control signals may include a signal to power on the output devices if they are off or to set the active data interface if they are connected to a different port.

19. In the input device of claim 18, the canvas unit is mounted to a frame in some embodiments, and the exciter speaker has two or more different sections.

20. In the input device of claim 19, the canvas unit may have a screen mounted within the frame in some embodiments for two-way face-to-face communication, and the exciter speaker has two or more different sections.

* * * * *